(12) United States Patent
Cantolino

(10) Patent No.: US 8,561,417 B1
(45) Date of Patent: *Oct. 22, 2013

(54) FLUID-SENSING SWITCH SYSTEM WITH REDUNDANT SAFETY ALARM CAPABILITY

(76) Inventor: Christopher Ralph Cantolino, Sarasota, FL (US)

( * ) Notice: Subject to any disclaimer, the term of this patent is extended or adjusted under 35 U.S.C. 154(b) by 733 days.

This patent is subject to a terminal disclaimer.

(21) Appl. No.: 12/796,609

(22) Filed: Jun. 8, 2010

Related U.S. Application Data

(63) Continuation of application No. 12/337,574, filed on Dec. 17, 2008, now Pat. No. 8,151,580.

(51) Int. Cl.
*F25D 21/00* (2006.01)

(52) U.S. Cl.
USPC ............................................................ 62/150

(58) Field of Classification Search
USPC ............................... 62/93, 150, 285, 291, 132
See application file for complete search history.

(56) References Cited

U.S. PATENT DOCUMENTS

| | | | |
|---|---|---|---|
| 7,710,283 B1* | 5/2010 | Cantolino | 340/623 |
| 2006/0208915 A1* | 9/2006 | Oakner et al. | 340/620 |

* cited by examiner

*Primary Examiner* — Melvin Jones
(74) *Attorney, Agent, or Firm* — Dorothy S. Morse

(57) ABSTRACT

A fluid-sensing switch system that can monitor pre-established threshold fluid levels in the primary drain pan inside an air conditioning unit or other condensate-producing unit, and also in a secondary drain pan positioned under the unit. Once the threaded plug of a sensing probe is connected to the unit's weep hole, it positions a center sensor providing a first power potential through a false-trigger-reducing resilient piece in a position to wait for rising fluid capable of breaching a weep hole dam. A substantially circular sensor is also present provides the second power potential needed for signal generation. A signal-generating member connected to both sensors is electrically connected to the unit to shut it off, and/or activate a pump that removes fluid from the secondary drain pan. The signal-generating member provides the redundant safety alarm capability, when mounted on a secondary drain pan. Anti-microbial elements are optional, but preferred.

18 Claims, 12 Drawing Sheets

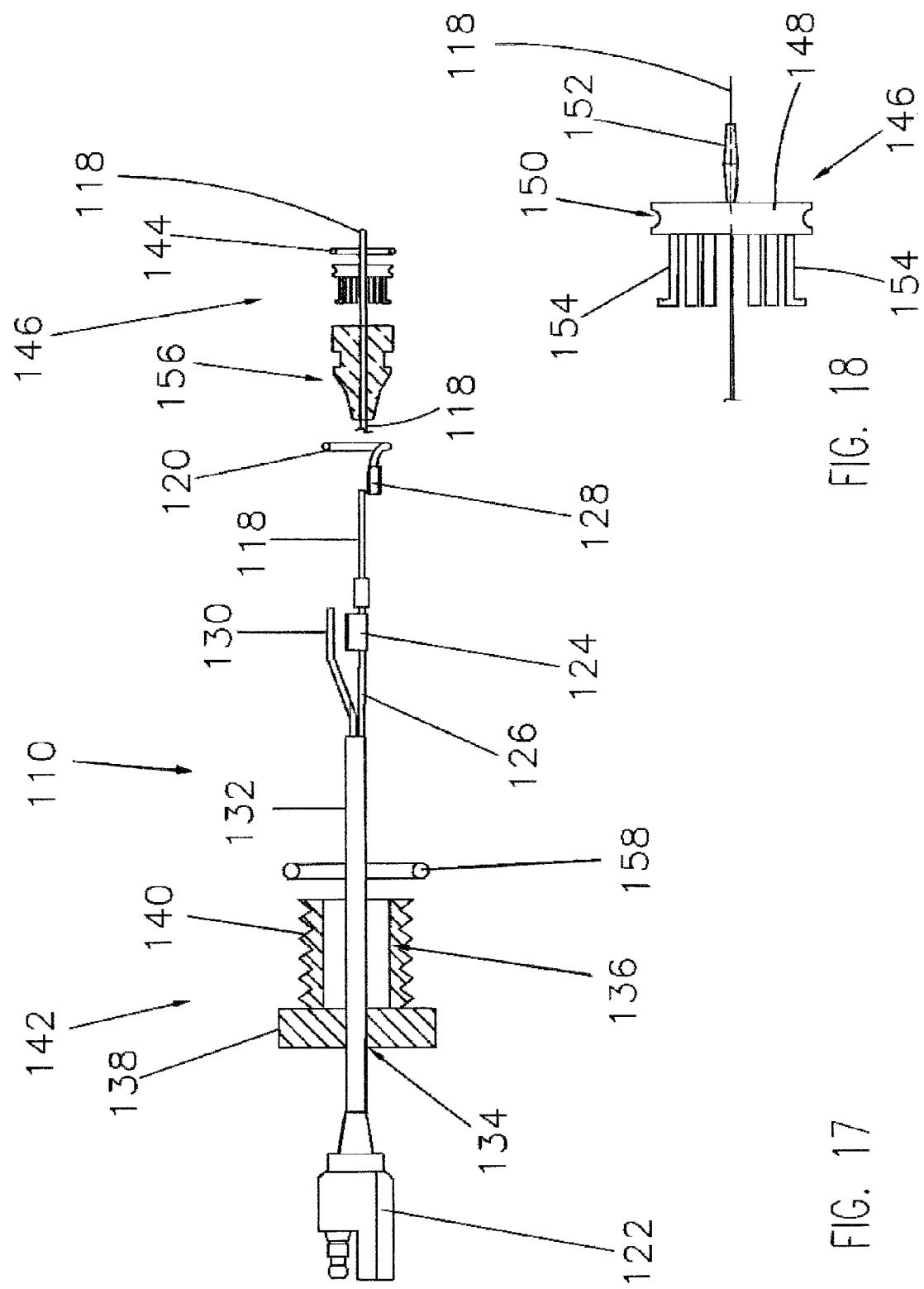

FLUID-SENSING SWITCH SYSTEM WITH REDUNDANT SAFETY ALARM CAPABILITY

CROSS-REFERENCES TO RELATED APPLICATIONS

This is a continuation-in-part application to Ser. No. 12/337,574 filed on Dec. 17, 2008 now U.S. Pat. No. 8,151,580 to the same inventor herein and having the same title of "Fluid-Sensing Switch System with Redundant Safety Alarm Capability"

BACKGROUND

1. Field of the Invention

The present invention generally relates to water detection systems associated with a drain pan placed under the air handling unit of an air conditioning system, or associated with the drain line connected to the weep hole of the air handling unit, and more particularly relates to a fluid-sensing switch system that monitors a pre-established threshold fluid level in the primary drain pan inside an air conditioning unit or other condensate-producing unit, and also monitors a typically different pre-established threshold fluid level in a secondary drain pan positioned under the unit, providing redundant safety alarm capability. Instead, prior art systems monitor the fluid level in the drain line carrying water or other fluid away from the unit's weep hole or monitor the fluid level in the secondary drain pan, but do not monitor the fluid level in the primary drain pan inside the air conditioning unit or other condensate-producing unit. Once the threaded plug of a sensing probe in the present invention is connected to the unit's weep hole, it positions a center or inner probe or sensor element (hereinafter also "center sensor") extending through its false-trigger-reducing resilient piece in a position to wait for fluid rising over a dam, without prematurely causing any activation as a result of water collected behind the dam. The resilient piece has opposing ends and a cone associated with each opposing end, one of which provides a drip path to wick fluid away from the center sensor. The center sensor provides a first power potential, while a substantially circular liquid sensing element or sensor also present provides the second power potential needed for safety-related signal generation, with the second power potential being a neutral potential. Optionally, an anti-microbial member may also be incorporated to prevent development of moss, algae, fungus, mold, or the like on the center of inner probe or sensor element. A signal-generating member connected to both sensors is electrically connected to the fluid-producing unit to shut it off, and/or to a pump for its activation to remove fluid from the secondary drain pan. The signal-generating member is also placed in association with the secondary drain pan to monitor a pre-established threshold fluid level therein. Mounting of the signal-generating member to a vertically-extending wall of the secondary drain pan is preferably accomplished via a double-sided tape and/or fasteners.

2. Description of the Related Art

Air handling systems such as furnaces or other heating, ventilating, or air conditioning systems associated with a building structure typically have a drain pan underneath at least a portion of the air handling unit to collect condensation and prevent it from damaging the unit itself, and/or its surroundings. However, the condensation produced in a twenty-four hour period can be more than the drain pan positioned below and air handling unit can hold. This is a particularly common occurrence with some air conditioning systems. Therefore, the drain pans associated with such systems are often mounted in a non-level orientation and connected to a drain pipe or hose that carries the collected condensate to a suitable location outside the structure. However, in the alternative some fluid collection applications require pumping for the removal of condensate from a secondary drain pan. Typically when a secondary drain pan is used, a fluid level sensing unit is placed in association with it. Thereafter, when the depth of collected condensate reaches a predetermined threshold level, the fluid level sensing unit generates a signal and sends it to a fluid-sensing switch systeming circuit to activate the pump. When sufficient water is removed from the drain pan for the water sensor to stop sending the activation signal, the fluid-sensing switch systeming circuit deactivates the pump. In this manner, the pump is only activated when necessary to pump water out of the drain pan, thereby prolonging the life of the pump, while preventing water from overflowing the vertically-extending walls of the drain pan.

Many prior art fluid level sensors in current use contain an upwardly-deployable float body. One disadvantage thereof is that during installation time-consuming float body height adjustment is typically needed to make certain that fluid collected in the associated secondary drain pan does not flow over the pan's vertically-extending walls, taking into consideration that condensate production does not immediately cease when the fluid-producing unit is shut off. The float body also requires a level orientation for proper and reproducible operation. If a float sensor is not correctly oriented, its float body may not immediately deploy and the pump may not be activated in time before fluid overflows the drain pan's vertically-extending walls. Such overflow generally leads to damage in the areas around the secondary drain pan, which may involve a floor, walls, a ceiling, and/or fixtures associated therewith, as well as other items/objects located nearby. In addition, false signaling may occur that causes pump activation when insufficient water is present, thereby damaging the pump. Thus, what is needed to provide a solution for all of the disadvantages noted above in the prior art, is a fluid level sensing unit for a collection/drain pan used with condensates or other fluids, which is durable for long-lasting and predictable use, has a reduced sensitivity to false signaling, does not require difficult or extended installer effort for accurate orientation, and can be relied upon to produce a signal after only a small amount fluid collects in the pan. These are all features provided by the present invention, which in addition to other desirable features and characteristics of the present invention will become apparent from the following invention description and its appended claims, as well as the accompanying drawings.

BRIEF SUMMARY OF THE INVENTION

It is the primary object of this invention to provide a fluid-sensing switch system that monitors a pre-established threshold fluid level in the primary drain pan inside an air conditioning unit or other condensate-producing unit, and also in a secondary drain pan positioned under the unit, providing redundant safety alarm capability. It is also an object of this invention to provide a fluid-sensing switch system that has a reduced sensitivity to false signaling. In addition, it is an object of this invention to provide a fluid-sensing switch system that is convenient to use and does not require difficult or prolonged installer effort for accurate positioning and orientation during its installation. It is also an object of this invention to provide a fluid-sensing switch system that can be relied upon to produce a signal after only a small amount fluid collects in the pan. It is a further object of this invention to provide a fluid-sensing switch system with a signal-generating member that can be used independently from its probe to monitor the pre-established threshold fluid level in a secondary drain pan. It is also an object of this invention to provide a fluid-sensing switch system that is adapted for convenient installer mounting to a vertically-extending wall of the secondary drain pan by at least two alternative means. In addition, it is an object of this invention to provide a fluid-sensing switch system that is cost effective to manufacture and requires no assembly at its installation site. A further object of this invention is to prevent and/or inhibit the growth of algae, mold, moss, fungus, and the like on its sensors.

The present invention, when properly made and used, provides safety alarm capability via the probe of a fluid-sensing switch system that is able to monitor a pre-established threshold fluid level in the primary drain pan inside an air conditioning unit or other condensate-producing unit, and also via the system's signal-generating member that when placed in association with a secondary drain pan positioned under the unit is able to monitor a typically different pre-established threshold fluid level therein. Thus, one present invention system can be used to serve both primary and secondary monitoring needs, thus providing redundant safety alarm capability. The preset invention fluid-sensing switch system is designed and constructed to activate when only a small amount of fluid is collected in either pan, which reduces the overall risk of fluid damage to the condensate-producing unit and its surroundings. It also has a reduced sensitivity to false signaling due to the design and structure of its probe, which includes a resilient piece with a cone that provides a drip path to wick fluid away from its substantially circular center sensor. A reduced amount of false signaling is also due to its signal-generating member having no deployable float. The simple interior structure of its signal-generating member lowers manufacturing cost, and since its signal-generating member has no deployable float and signal generation may occur when collected fluid comes into contact with only one of the wires connected to it, its installation is simple and easy. Furthermore, the present invention fluid-sensing switch system can be relied upon to produce a signal after only a small amount fluid collects in either pan little, also resulting in little or no false signal generation. In addition, its fluid-sensing switch system has a signal-generating member that can be used independently from its probe to monitor the pre-established threshold fluid level in a secondary drain pan. Added convenience is provided since the present invention fluid-sensing switch system is adapted for convenient mounting to a vertically-extending wall of the secondary drain pan by at least two alternative means, double-sided tape and fasteners. Once the threaded plug of its sensing probe is connected to the unit's weep hole, it positions a center sensor extending through a false-trigger-reducing resilient piece in a position within the unit to wait for fluid rising over a dam, without being prematurely activated as a result of water collected behind the dam. The center sensor provides a first power potential, while a substantially circular sensor also present provides the second neutral power potential needed for signal generation. The signal-generating member electrically connected to both sensors is also electrically connected to the fluid-producing unit to shut it off, and/or activate a pump that removes fluid from the secondary drain pan located under the fluid-producing unit for safety-enhanced unit operation.

Thus, the present invention is a fluid-sensing switch system that provides generation of a predetermined output in response to a water sensor input. The fluid-sensing switch system includes a first input, a second input, and an output. The first input couples a source line to a first power potential. The second input couples a neutral line to a second power potential, the second power potential being a neutral potential. The output couples a load line to the fluid-producing unit for shutting it off and/or to a pump capable of evacuating water from an associated drain pan positioned under a fluid-producing unit. A signal-producing member connected to the first and second inputs generates a switching signal in response to the drain pan water level detection signal. Since the signal-producing member connects the first input to the output in response to the switching signal, the first power potential as a predetermined output to the pump is provided.

BRIEF DESCRIPTION OF THE SEVERAL VIEWS OF THE DRAWINGS

One reviewing the accompanying figures must understand that they have not necessarily been drawn to scale and are illustrated for simplicity and clarity. As a result, in some of the illustrations only those components that are pertinent to understanding the present invention may be shown and/or numbered. Identical numbering is given to identical or functionally similar elements throughout the separate figures, thereby attempting to illustrate the most preferred embodiments of the present invention while explaining various principles and advantages thereof. Also, during review of the accompanying figures one must appreciate that the dimensions of some of the elements in them may be exaggerated where needed relative to other elements to help provide a better understanding of the present invention. In most instances, such exaggeration will be noted.

FIG. 17 is a partial detained exploded side view of the alternate embodiment of the liquid level sensing system of the present invention depicted in FIG. 16.

FIG. 18 is a partial detained exploded side view of the alternate embodiment of the liquid level sensing system of the present invention depicted in FIG. 16.

DETAILED DESCRIPTION OF THE INVENTION

Figure 1:
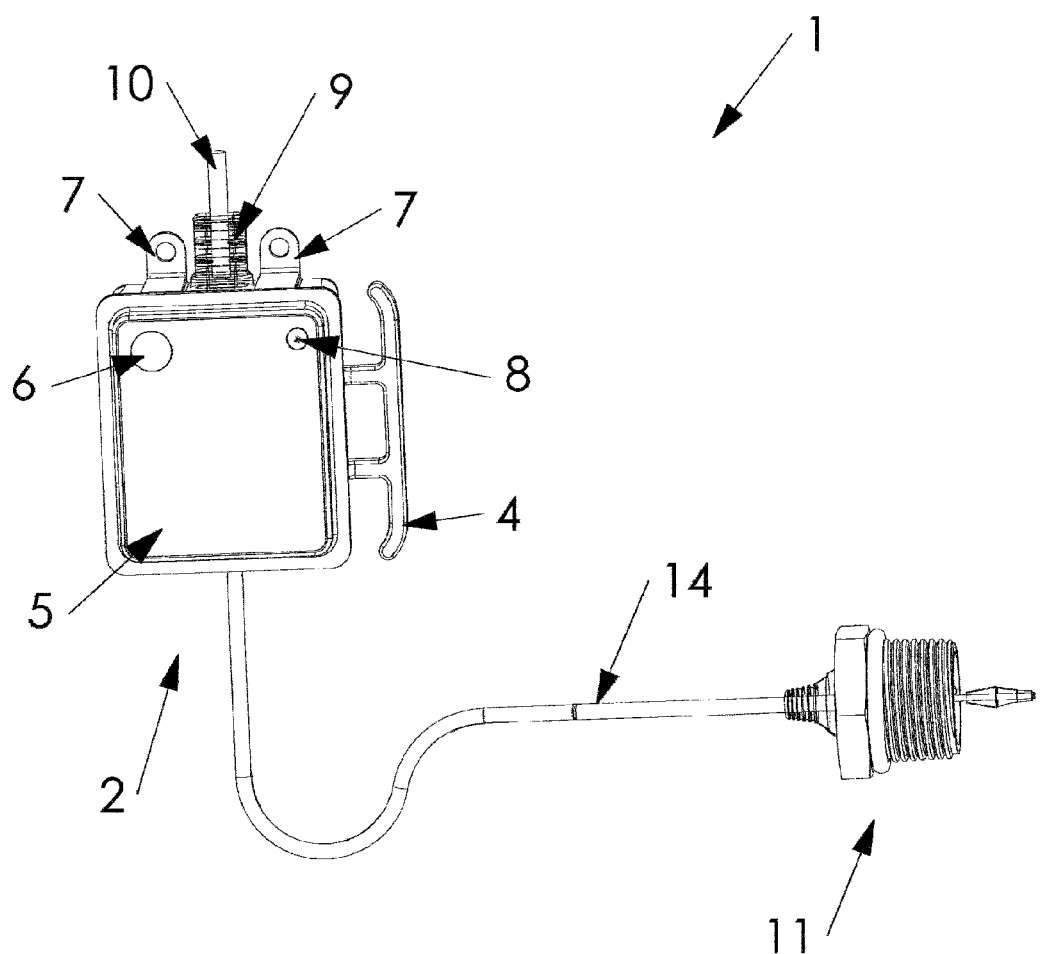
FIG. 1 is a front view of the most preferred embodiment of the present invention with a sensing probe electrically connected to a signal-producing member.

The following description of the most preferred embodiment of the present invention is merely exemplary in nature and is not intended to limit the invention's structure, function, or application. However, with that said, the present invention provides a fluid-sensing switch system 1 that monitors a pre-established threshold fluid level in the primary drain pan (not shown) inside an air conditioning unit or other condensate-producing unit (not shown), and also monitors a typically different pre-established threshold fluid level in a secondary drain pan (not shown) positioned under the unit, providing the option for redundant safety alarm capability. If a secondary drain pan is not employed under the fluid-producing unit associated with the sensing probe 11 of the present invention fluid-sensing switch system 1, the signal-producing member 2 (also hereinafter "sensing electronic or signal producing means 2") associated with sensing probe 11 may be mounted in any convenient location that permits it to fulfill its intended function. In contrast, prior art systems (not shown) are configured and positioned to monitor the fluid level in the drain line carrying water or other fluid away from the weep hole (such as but not limited to drain port 112 in FIG. 16) of an air conditioning unit or other condensate-producing unit (not shown), or in the alternative are configured and positioned to monitor the fluid level in a secondary drain pan, but do not have the capability to monitor the fluid level in the primary drain pan inside the air conditioning unit or other condensate-producing unit. Once the threaded plug 12 of the sensing probe 11 in the most preferred embodiment 1 of the present invention is connected to the unit's weep hole (such as drain port 112 in FIG. 16), it positions a center sensor 18 extending through a false-trigger-reducing resilient piece 13 in a position to wait for fluid rising over a dam (not shown), without prematurely causing any signal activation as a result of water collected behind the dam. The resilient piece 13 has opposing ends and a cone associated with each opposing end, one of which provides a drip path to wick fluid away from the center sensor 18. The center sensor 18 provides a first power potential, while a substantially circular sensor 19 also present provides the second power potential needed for safety-enhancing signal generation, with the second power potential being a neutral potential. A signal-generating member 2 connected to both sensors (18 and 19) is electrically connected to the fluid-producing unit (not shown) to shut it off, and/or to a pump (not shown) for its activation to remove fluid from the secondary drain pan. The signal-generating member 2 may also placed in association with the secondary drain pan for cost efficient monitoring of a pre-established threshold fluid level therein. Mounting of the signal-generating member 2 to a vertically-extending wall of the secondary drain pan is preferably accomplished via double-sided tape 34 and/or fasteners connected through holes in mounting brackets 7.

Although not shown, the present invention is commonly used to monitor the air handling system (not shown) in a building structure to provide safe and proper system operation. An air handler, such as a forced air furnace, ventilator, or cooler, receives air from an intake and pushes the air out through a duct. During the air handling process, the temperature of the air is altered as it passes through the air handler. Such activity produces condensation, particularly when the air is cooled by an air conditioning system associated with the air handler. Under the influence of gravity, condensation is typically collected by a primary drain pan located within the air handler, with a secondary drain pan also optionally present to collect additional fluid under the air handler and reduce the opportunity for fluid damage to the unit itself and/or its surroundings. However, the condensation produced in a twenty-four hour period can be more than the secondary drain pan can hold. Thus, the present invention provides safe and proper air handling system operation by an association with the primary drain pan within the system, and preferably also (but optionally) through association of its signal generating member 2 with a secondary drain pan placed at least in part under the air handling system. When a secondary drain pan is used and the signal-producing member 2 of the present invention is placed in association with it, signal-producing member 2 provides cost-efficient redundant safety alarm capability not provided by any known prior art fluid-level monitoring devices. Although not limited to the following dimension examples, signal-generating member 2 may have length and/or width dimensions between two and three inches, the thickness dimension of signal-generating member 2 may be between one and two inches, and the length and diameter dimensions of sensing probe 11 may be between one and two inches. Furthermore, although the materials used for the components of the present invention may vary, it is preferred that they have a temperature rating at least up to 275-degrees.

FIG. 1 shows the most preferred embodiment of the present invention 1 with a sensing probe 11 electrically connected via wiring 14 to a signal-producing member 2. The features and component positioning for sensing probe 11 are disclosed in more detail in FIGS. 4-14, and are not described in detail in FIG. 1. It is sensing probe 11 that monitors the water level in the primary drain pan of a fluid-producing unit (not shown). However, FIG. 1 does show the outer case 3 of signal-producing member 2 having cable wrapping feature 4 that can be used by an installer to downwardly adjust the length of wiring 14 to accommodate the application, as needed. FIG. 1 also shows the signal output wire 10 that is used to transmit a shut-off or activation signal generated by signal-producing member 2 to a fluid-producing unit or pump associated with a secondary drain pan. FIG. 1 further shows over-molding 9 that secures signal output wire 10 in place and provides a watertight seal around signal output wire 10. In addition, FIG. 1 shows two mounting brackets 7, one on each side of signal output wire 10 and over-molding 9 that can be used with fasteners (not shown) to secure outer case 3 to the vertically-extending wall of a secondary drain pan (not shown). A label 5 is shown extending substantially across the front portion of outer case 3, with accommodation 6 shown for the electrical connection means 31 secured to printed circuit board 33 that provides electrical communication via feature 30/46 on cover 28 with output signal wire 10 and the accommodation 8 shown for a lamp 47 that provides visual evidence of signal production by signal-generating member 2 (which can also be used by an installer to confirm proper operation at the time of installation as lamp 47 lights up when current is running through it). Although not shown, an audible alarm may also be associated with outer case 3 and powered via electrical connection to printed circuit board 33. The perimeter configuration of outer case 3 is not limited to that shown in FIG. 1, but design considerations for its size and shape should be guided by cost-efficient objectives and space limitations shared by common installation sites. The configuration of wore wrapping feature 4 is also not limited to that shown in FIG. 1, and its design considerations should also be guided by cost-efficient objectives and space limitations shared by common installation sites. In addition, the amount and configuration of material around the holes in mounting brackets 7 is not critical, although material without sharp corners is preferred. Furthermore, the positioning and configuration of accommodations 6 and 8 are not critical, and the configuration and positioning of over-molding 9 is not limited to that shown in FIG. 1, however, use of resilient material and a configuration allowing for pull-through seating of over-molding 9 within aperture 38 to provide a secure and watertight seal around signal output wire 10 are preferred.

Figure 2:
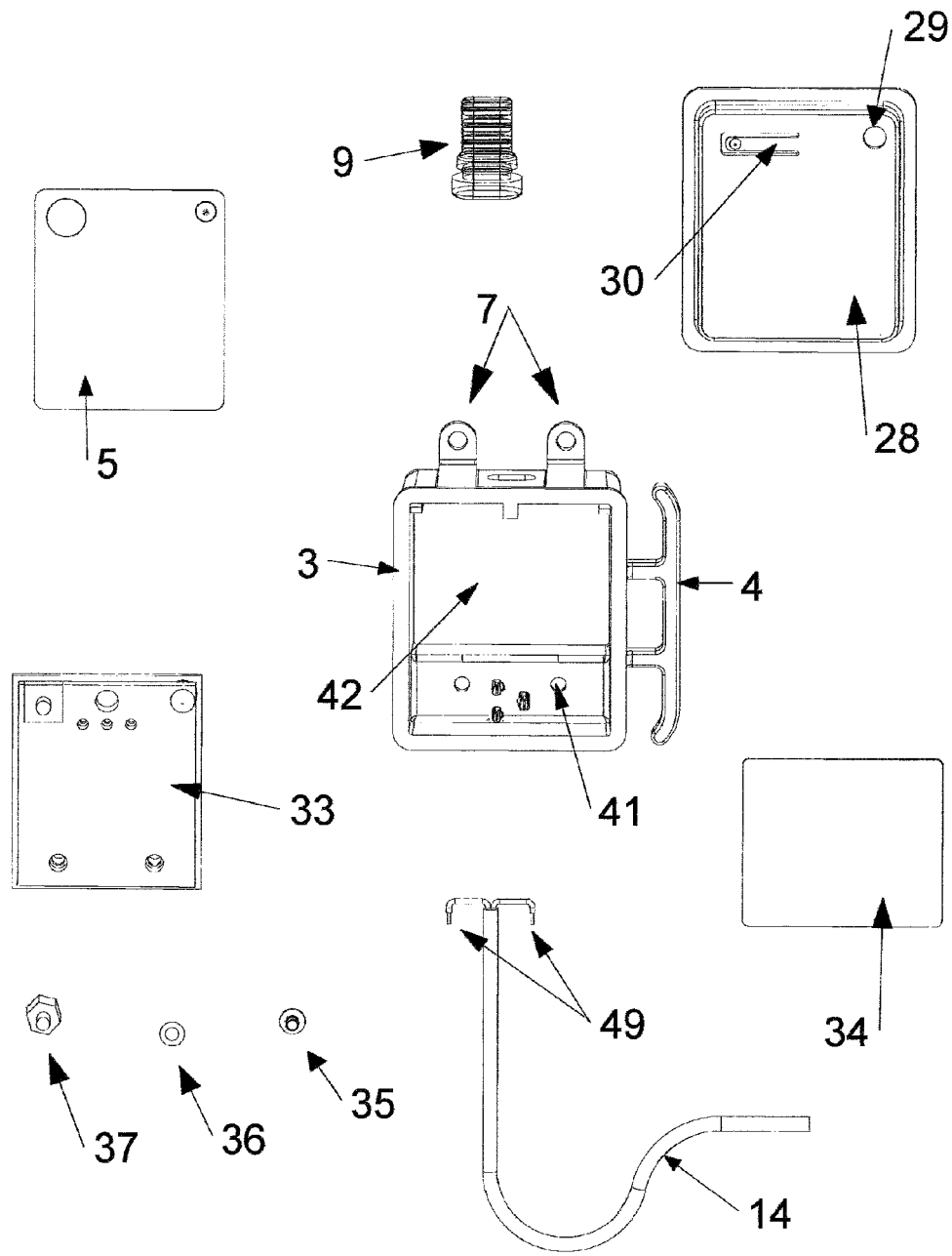
FIG. 2 is an exploded front view of a signal-producing member that can be used in the most preferred embodiment of the present invention after its label and cover are removed.
Figure 3:
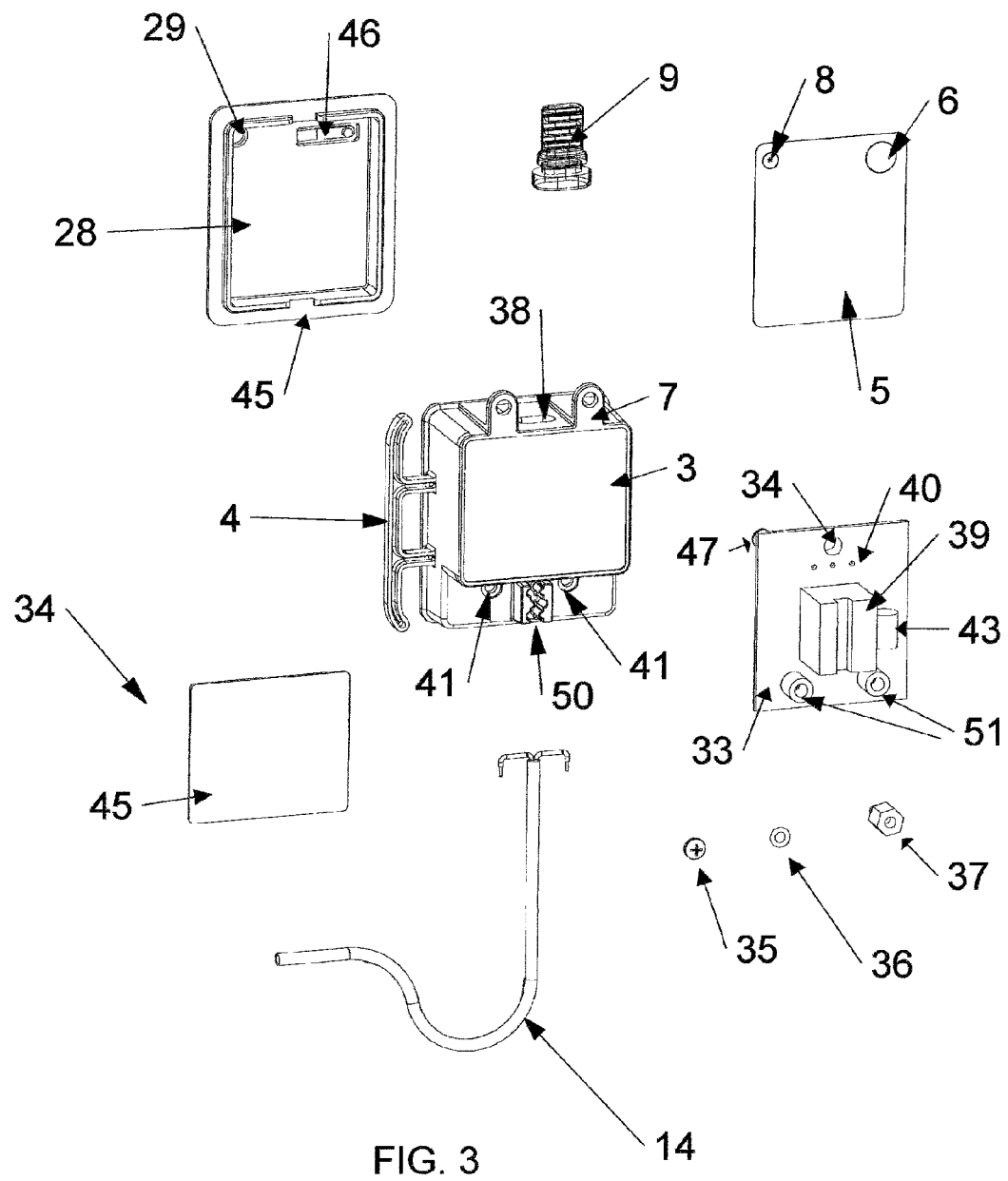
FIG. 3 is an exploded front view of a signal-producing member that can be used in the most preferred embodiment of the present invention after its label and cover are removed and invention components in the same positions relative to the outer case as is shown in FIG. 2.

FIGS. 2 and 3 each show an exploded view of a signal-producing member 2 that can be used in the most preferred embodiment of the present invention. Both show label 5, over-molding 9, front cover 28, printed circuit board 33, double-sided tape 34, wiring 14, and one of the fasteners 35, O-rings/washers 36, and nuts 37 used to fasten wiring 14 in a fixed position relative to outer case 3 being removed from outer case 3 and positioned in a similar position relative to outer case 3 in both illustrations. FIG. 2 provides a front view of all invention components present, while FIG. 3 provides a back view of the same invention components. In FIGS. 2 and 3 outer case 3 is shown centrally. Directly above outer case 3 in both FIGS. 2 and 3 is over-molding 9, the configuration of which is intended to fit closely around signal output wire 10. Also, it is contemplated for over-molding 9 to be made from resilient material for pull-through association with aperture 38 (best seen in FIG. 3 between the two mounting brackets 7). On the upper left of outer case 3 in FIG. 2 (and correspondingly on the upper right of outer case 3 in FIG. 3), label 5 is shown to have a generally rectangular configuration, as well as accommodations 6 and 8 for a lamp 47 and electrical connection means 31 for output signal wire 10. The presence of lamp 47 is preferred for test purposes during installation to confirm proper operation of signal-producing member 2 and sensing probe 11, however, the present of an audible alarm can be optional.

On the upper right of outer case 3 in FIG. 2 (and correspondingly on the upper left of outer case 3 in FIG. 3), cover 28 is shown to have an opening 29 through which lamp 47 can extend, means 30 and 46 to secure the electrical connection means 31 for output signal wire 10 in a fixed position relative to outer case 3, and a notch 45 configured to accommodate unnumbered connecting tabs for wire clamp 50 (shown on the back of outer case 3 in FIG. 3) that extend through outer case 3 and are shown between the two fastener holes 41 each in an opposed position to a different one of the mounting brackets 7 in FIG. 2. Since no attachment holes are shown through cover 28 or label 5, it is assumed that cover 28 is secured against outer case 3 via snap-fit connection and that label 5 is adhered to cover 28 via adhesive and/or bonding agents (not shown). Additionally, on the lower left of outer case 3 in FIG. 2 (and correspondingly on the lower right of outer case 3 in FIG. 3), printed circuit board 33 is shown to have a generally rectangular configuration, as well as an through-hole 34, small vent openings 40, a signal-generating module 43, a centrally-located feature 39 that optimally positions and strengthens printed circuit board 33, and mounting tubes 51 adapted for use in connecting wiring 14 to printed circuit board 33. On the lower right of outer case 3 in FIG. 2 (and correspondingly on the lower left of outer case 3 in FIG. 3), double-sided tape 34 is shown to have a generally rectangular configuration, with the rear surface of double-sided tape 34 marked with the number 45 to indicate a protective liner that is immediately releasable prior to installation should adhesive layer (not shown) under protective liner 45 be desired for use in attaching outer case 3 to the vertically-extending wall (not shown) of a secondary drain pan. Shown beneath outer case 3 in both FIGS. 2 and 3 is the wiring 14 that is used to connect center sensor 18 and substantially circular sensor 19 in sensing probe 11 to the signal-generating module 43 connected to the printed circuit board 33 fixed within outer case 3. In FIG. 2 the ends of wiring 14 are identified by the number 49, which are each connected through a different one of the tubes 51 through printed circuit board 33 via a fastener 35, O-ring/washer, and nut 37, also shown in FIGS. 2 and 3 below printed circuit board 33. Although the configurations and relative sizes of present invention components shown in FIGS. 2 and 3 are preferred, some variation in perimeter configuration, size, connection, and/or number can be expected (such as the number of fasteners 35, O-rings/washers 36, mounting brackets 7, and the like that are employed).

Figure 4:
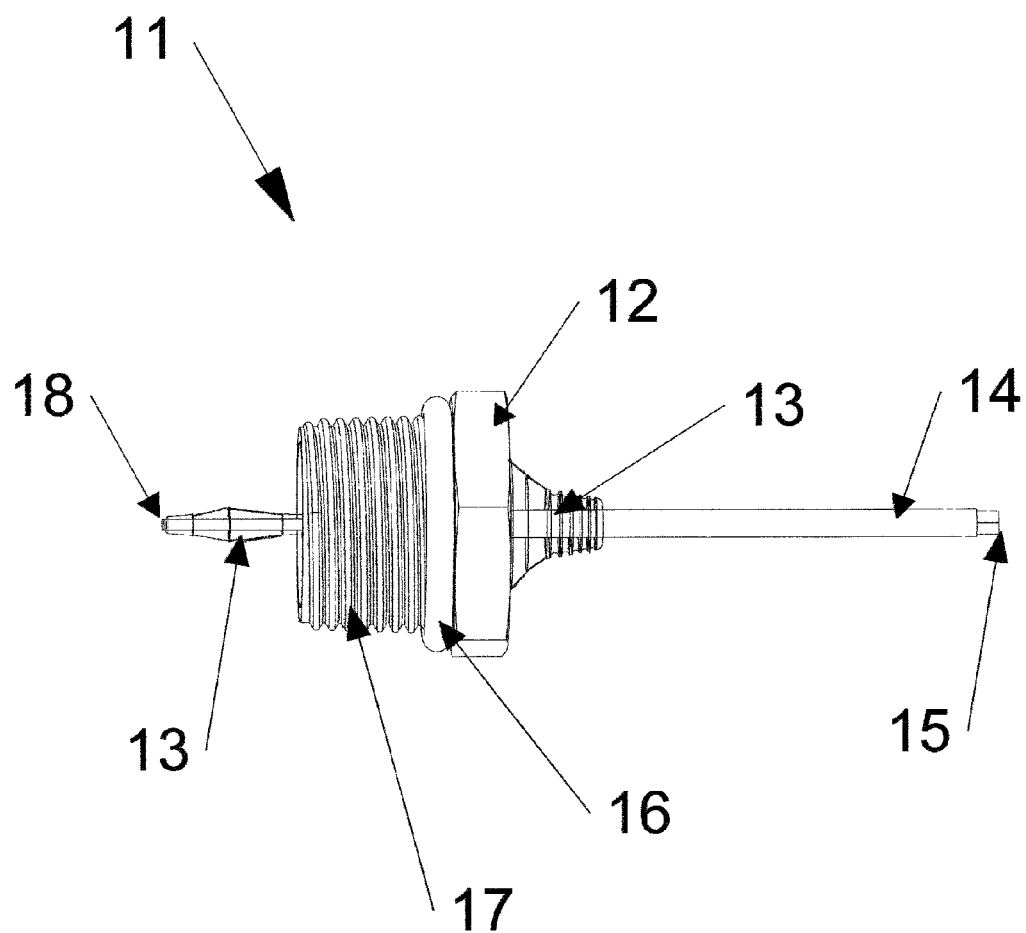
FIG. 4 is a side view of a sensing probe that can be used in the most preferred embodiment of the present invention.
Figure 5:
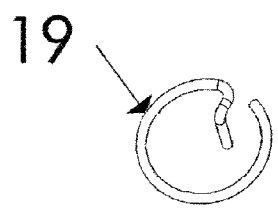
FIG. 5 is a perspective view of a substantially circular sensor that can be used in the most preferred embodiment of the present invention.
Figure 6:
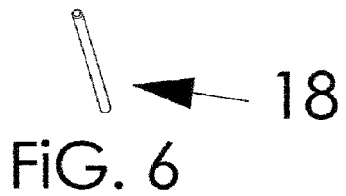
FIG. 6 is a perspective view of a center sensor that can be used in the most preferred embodiment of the present invention.
Figures 7, 8:
FIG. 7 is a perspective view of a wire terminal that can be used in the most preferred embodiment of the present invention.
FIG. 8 is a perspective view of the wire terminal shown in FIG. 7 that is rotated approximately 90-degrees from the position illustrated in FIG. 7.
Figure 9:
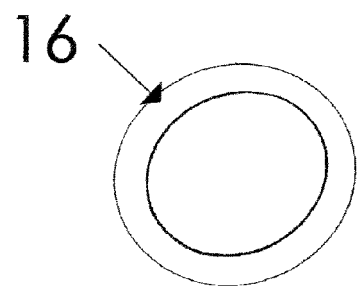
FIG. 9 is a front view of an O-ring that can be used in the most preferred embodiment of the present invention.
Figure 10:
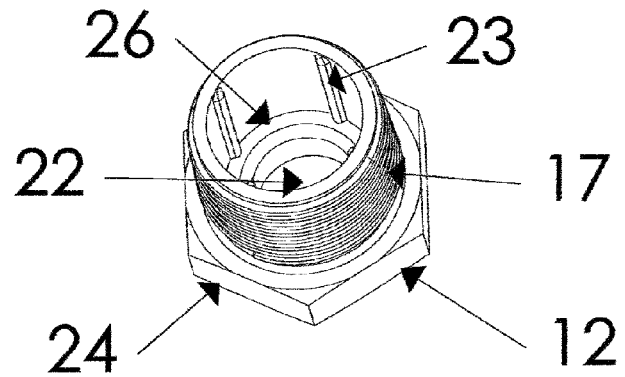
FIG. 10 is a perspective view of an externally-threaded plug that can be used in the most preferred embodiment of the present invention.
Figure 11:
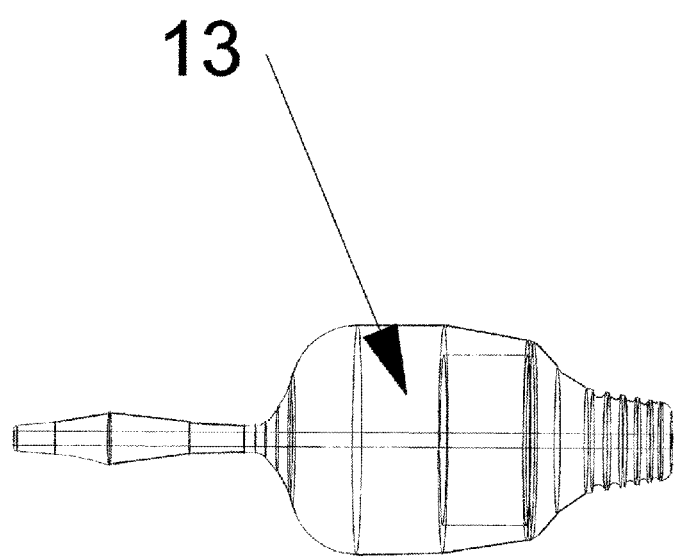
FIG. 11 is side view of a resilient sealing piece that can be used in the most preferred embodiment of the present invention, with the cone-shaped end of the sealing piece configured to surround the center sensor and provide a drip path to wick fluid away from the center sensor to reduce false signal production.
Figure 12:
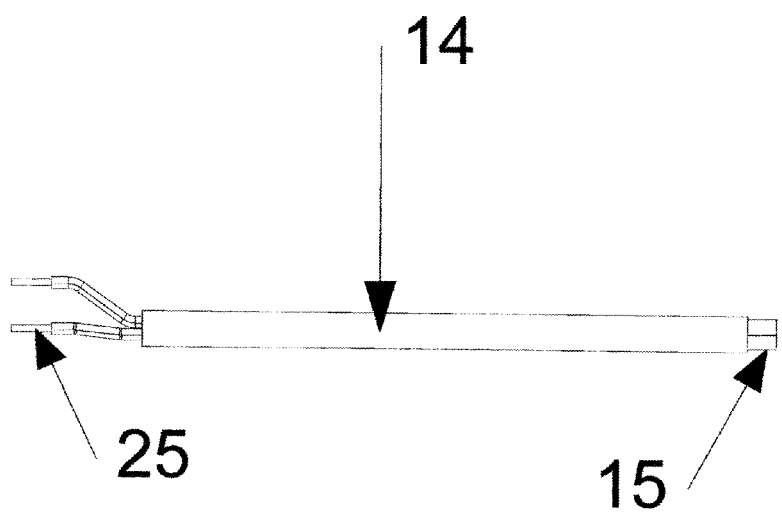
FIG. 12 is a side view of electrical wiring that can be used in the most preferred embodiment of the present invention between the two sensors in the probe and the signal-producing member.
Figure 13:
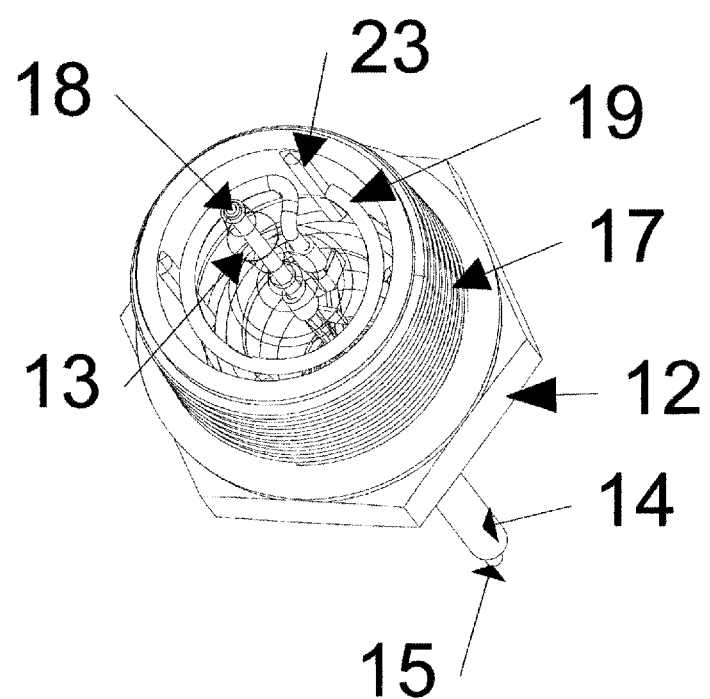
FIG. 13 is a perspective view of the substantially circular sensor, center sensor, and resilient sealing piece in their preferred positions of use in the most preferred embodiment of the present invention.

FIGS. 4-14 show various views, features, and relative positioning thereof for the components of a sensing probe 11 that can be used in the most preferred embodiment of the present invention 1. FIG. 4 shows a side view of sensing probe 11 with its plug 12 having a hex-shaped base depending from a threaded portion 17 that is used for fast and easy connection thereof within the weep hole (such as drain port 112 in FIG. 16) of a fluid-producing unit (not shown) and removal therefrom, an O-ring 16 positioned around part of threaded portion 17, a center sensor 18 extending beyond one end of a false-trigger-reducing resilient piece 13 (wherein the cone-shaped portion of resilient piece 13 surrounding center sensor provides a drip path to wick fluid away from center sensor 18), and wiring 14 that reveals two wires 15, one of which would be connected to center sensor 18 and the other of which would be connected to the substantially circular sensor shown in FIG. 10. In addition, FIG. 5 reveals more information about the preferred configuration of a substantially circular sensor 19 that can be used in the most preferred embodiment of the present invention, FIG. 6 reveals more information about the preferred configuration of a center sensor 18 that can be used in the most preferred embodiment of the present invention, and FIGS. 7 and 8 reveal more information about the preferred configuration of a wire terminal 20 (two are used in sensing probe 11) with extensions 21 that can be used in the most preferred embodiment of the present invention to secure the proximal end of either center sensor 18 or substantially circular sensor 19 and provide electrical communication with the signal generating module 43 attached to printed circuit board 33. Furthermore, FIG. 8 shows wire terminal 20 rotated approximately 90-degrees from the position illustrated in FIG. 7. Additionally, FIG. 9 shows an O-ring 16 that can be used in the most preferred embodiment of the present invention to provide a watertight seal between plug 12 and a fluid-producing unit when sensing probe 11 is secured in fixed relation to fluid-producing unit via its weep hole (such as drain port 112 in FIG. 16), while FIG. 10 shows more detail about the externally-threaded plug 12 that can be used in the most preferred embodiment of the present invention. FIG. 10 shows threads 17 on the external surface of plug 12, a concave area 24 for use in seating O-ring 16 around external threads 17 and providing a watertight seal for plug 12 when it is connected to the weep hole (such as drain port 112 in FIG. 16) of a fluid-producing unit, and the central opening 22 through plug 12 that permits the pull-through seating of the resilient sealing piece 13 shown in FIG. 14 that secures wiring 14 and center sensor 18 in their usable positions relative to plug 12. In addition, FIG. 10 shows several internal longitudinally-extending ribs 23 that are used to strengthen plug 12, assist in protecting substantially circular sensor 19 when placed within the externally-threaded portion of plug 12 (as shown in FIG. 13), and help to secure resilient sealing piece 13 into its usable position. FIG. 10 also shows an inner O-ring 26 employed to assist in providing a watertight seal between resilient sealing piece 13 and the internal surfaces of plug 12. Although the configurations and relative sizes of present invention components shown in FIGS. 4-14 are preferred, some variation in perimeter configuration, size, connection, and/or number can be expected (such as the number of ribs 23, threads 17, and convolutions in the surface perimeter of resilient sealing piece 13 that are employed). The cone-shaped end of resilient sealing piece 13 shown in FIG. 14 around center sensor 18 is configured to provide a drip path to wick fluid away from center sensor 18 and thereby reduce false signal production.

Figure 14:
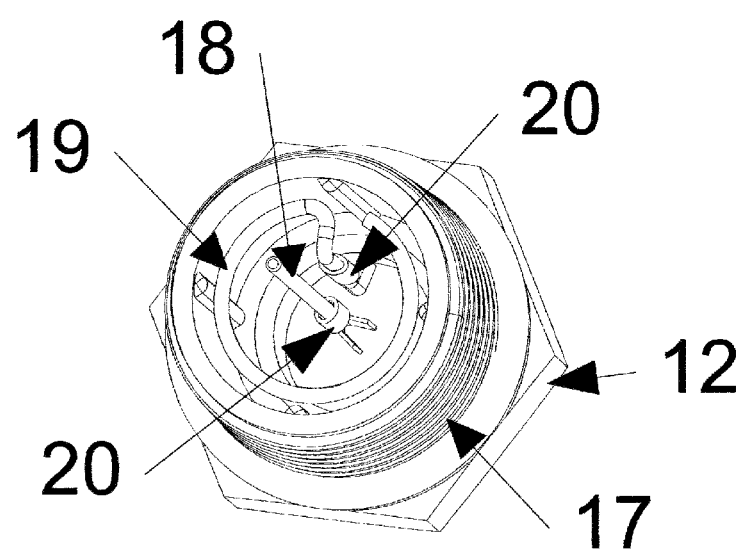
FIG. 14 is a perspective view of one end of the center sensor and the substantially circular sensor each being connected to a wire terminal within the interior chamber of the externally-threaded plug used in the most preferred embodiment of the present invention.

FIGS. 12-14 also show additional information about components of sensing probe 11. FIG. 12 is a side view of electrical wiring 14 that can be used in the most preferred embodiment of the present invention between the two sensors (center sensor 18 and substantially circular sensor 19) in probe 11 and the signal-producing member 2. Two wires 15 are shown at one end of electrical wiring 14 that extend toward signal-producing member 2, which are in opposition to the exposed and separated ends 25 that each become connected to a different one of the sensors of probe 11, either substantially circular sensor 19 or center sensor 18. FIG. 13 shows substantially circular sensor 19 and center sensor 18 surrounded by resilient sealing piece 13, with all three in their preferred positions of use in the most preferred embodiment of the present invention 1. To better see the connection of the proximal ends of substantially circular sensor 19 and center sensor 18 each to a different wire terminal 20 (clearly visible and marked in FIG. 14), resilient sealing piece 13 in FIG. 13 has been made substantially transparent. FIG. 13 also shows how the longitudinally-extending ribs 23 within the threaded portion 17 of plug 12 help to define a position of use for substantially circular sensor 19 and protect maintain it therein. FIG. 13 also shows the electrical wiring 14 extending from plug 12 in a direction opposed to center sensor 18. The same features in FIG. 13 are more clearly visible in FIG. 14, where the resilient sealing piece 13 has been omitted.

Figure 15:
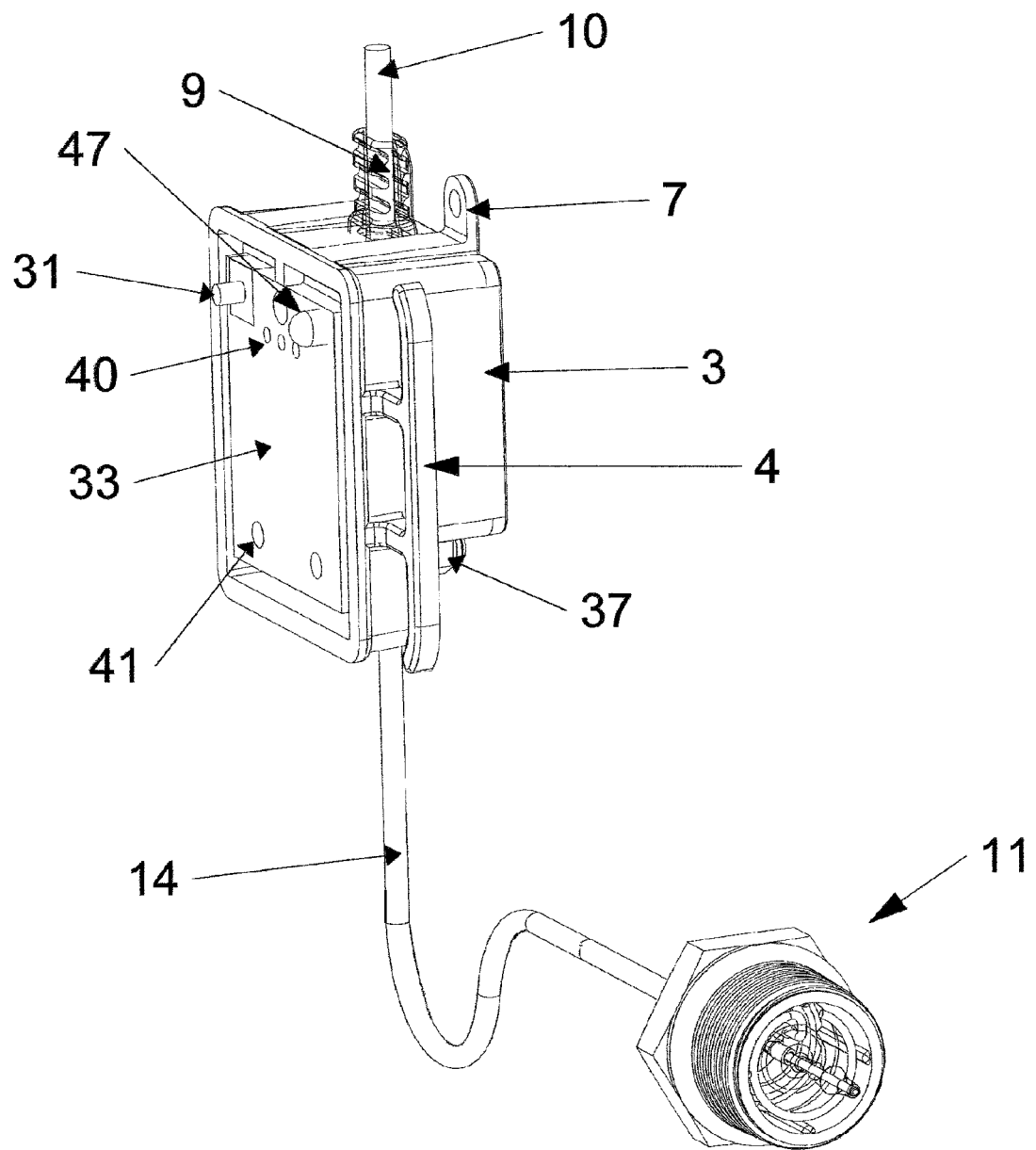
FIG. 15 is a perspective view of the most preferred embodiment of the present invention with the label and cover removed from the signal-producing member to show the test lamp and other features associated with the front surface of the printed circuit board.

FIG. 15 is a perspective view of the most preferred embodiment of the present invention 1 with the label 5 and cover 28 removed from the signal-producing member 2 to show the test lamp 47 and other features associated with the front surface of the printed circuit board 33. Lamp 47 is preferably a light-emitting diode (LED), but not limited thereto. The orientation of sensing probe 11 to signal-producing member 2 shown in FIG. 15 is not critical. Furthermore, should an excess amount of electrical wiring 14 be available in a application of present invention 1, surplus electrical wiring 14 can be wound around wire wrapping feature 4 attached to one side of outer case 3. Although use of wire wrapping feature 4 is helpful to an installer, its presence is not critical. In FIG. 15 signal output wire 10 is visible through over-molding 9, which may be made from transparent or translucent material, but is not limited thereto. Also in FIG. 15, fasteners 35 and associated nuts 37 (see FIGS. 2 and 3 for numerical marking) secure the split ends 49 of electrical wiring 14 against outer casing 3 and facilitate the electrical communication needed between electrical wiring 14 and printed circuit board 33. The O-ring/washer 36 shown in FIGS. 2 and 3 is also present but not visible in FIG. 15, being positioned between the back surface of printed circuit board 33 and an associated nut 37. When the unnumbered extension of a different nut 37 (see FIG. 2 for the best view of the unnumbered extension) is positioned in each of the two fastener holes 41 shown in FIG. 15 at the bottom of printed circuit board 33, the signal-producing member 2 shown is ready for the addition of cover 28 and label 5. Whether signal-producing member 2 is placed into a level orientation (or not) relative to the vertically-extending wall of a secondary drain pan (not shown) is not critical, as the contact of rising fluid with either fastener 35 or split end of wiring 14 will cause signal generation and subsequent action to prevent overflow of fluid collected in the associated secondary drain pan (not shown).

Thus, it can be seen that the first preferred embodiment 1 of the present invention provides a fluid-sensing switch system that monitors a pre-established threshold fluid level in the primary drain pan (not shown) inside an air conditioning unit or other condensate-producing unit (not shown), and also monitors a typically different pre-established threshold fluid level in a secondary drain pan (not shown) positioned under the unit, providing the option for redundant safety alarm capability. It does not require prolonged or difficult installer effort for accurate orientation to ensure proper and reliable signal generating operation, and there is reduced sensitivity to false signaling. Although focus of the description herein thus far has been directed to first preferred embodiment 1, it should be appreciated that a vast number of variations also exist, including the following second/alternate embodiment 110 shown in FIGS. 16-18 and having anti-microbial capability.

Figure 16:
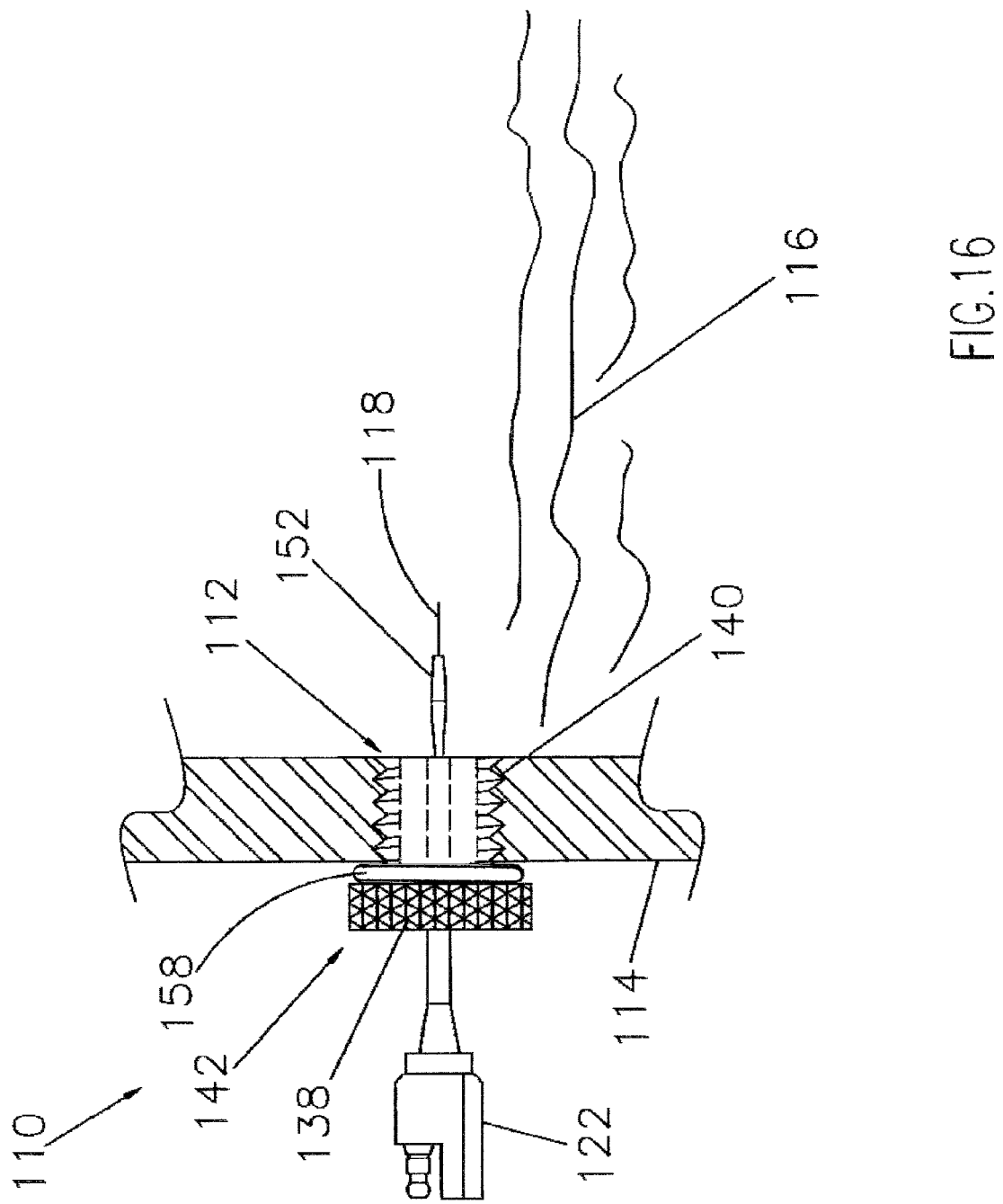
FIG. 16 is a side view of an alternate embodiment of the liquid level sensing system of the present invention mounted to a primary drain pan.

FIGS. 16 through 18 show an alternate embodiment of the liquid level sensing system of the present invention generally indicated as 110 mounted to a drain port 112 formed through the side wall 114 of a drain pan (not shown) to trap or collect condensate 116 from an air handler (not shown) or other liquid producing device or system, with alternate embodiment 110 (also hereinafter "liquid level sensing system 110") including means to inhibit or prevent the formation of moss, algae, fungus and the like adjacent or in the vicinity of liquid sensing elements described hereinafter.

As best shown in FIGS. 17 and 18, the liquid level sensing system 110 comprises a first liquid sensor or inner liquid sensing probe or element 118 and a second liquid sensor or outer substantially circular liquid sensing element 120 operatively or electrically coupled to a connector 122 by a inner sensor terminal 124 and an inner sensor conductor 126 combination and an outer sensor terminal 128 and an outer sensor conductor 130 respectively. Preferably, the connector 122 shown in FIG. 17 is one half of a water-resistant, quick-disconnect connector, with the mating portion thereto being complementary in configuration.

The inner sensor conductor 126 and the outer sensor conductor 130 disposed within a sheath or cover 132 extend through a passage 134 and a chamber 136 formed in an enlarged outer portion 138 and reduced hollow inner portion 140 of an externally threaded hollow plug (generally indicated as 142) configured to mount the liquid level sensing system 110 to the side wall 114 (see FIG. 16) of the drain pan (not shown) to secure the inner probe or sensor element 118 and the outer substantially circular sensor element 120 in liquid sensing relationship relative to the interior of the drain pan (not shown) as described hereinafter.

If moss, algae, fungus, mold, or the like is allowed to grow or develop near and on the center or inner probe or sensor element 118 and the outer substantially circular sensor element 120 an electrical path can be created therebetween resulting in a residual circuit causing the electronics to reset slowly when liquid is removed from the center or inner probe or sensor element 118. Thus, an anti-microbial member 144 is disposed or coupled to the reduced hollow inner portion 140 of the externally threaded hollow plug 142 by a coupler or mounting member generally indicated as 146. The anti-microbial member 144 may comprise a ring or substantially circular element of copper, zinc, silver or other anti-microbial material. Of course, the anti-microbial member 144 may comprise other shapes or configurations.

The coupler or mounting member 146 comprises a body 148 including a groove or recess 150 formed about the periphery thereof to receive and retain the anti-microbial member 144 therein by press-fitting the anti-microbial member 144 into the groove or recess 150. A hollow liquid wicking member 152 extends outwardly from the body 148 into the drain pan (not shown) having the inner or center probe or sensor element 118 extending therethrough to draw liquid away from the center probe or sensor element 118 to the outer substantially circular sensor element 120. Constructed of a hard material such as polycarbonate with a low absorption rate, the hollow liquid wicking member 152 causes liquid to form into beads or droplets that migrate away from the center probe or sensor element 118 to reduce premature activation of the liquid level sensing system 110 and allow it to more quickly reset after the liquid with in the drain pan (not shown) has returned to an acceptable level. A plurality of flexible mounting legs or members each indicated as 154 extend outwardly from the body 148 to press-fit or snap into the chamber 136 of the externally threaded hollow plug 142 to secure the coupler or mounting member 146 in place. When so positioned, the coupler or mounting member 146 engages the inner or center probe or sensor element 118, the outer substantially circular sensor element 120 and the anti-microbial member 144 to retain these components in place.

After the various components are assembled, a thermoplastic or similar flowable material may be injected into the chamber 136 of the externally threaded hollow plug 142 to form a center seal member generally indicated as 156 between the interior of the drain pan (not shown) and the exterior thereof.

When the externally threaded hollow plug 142 is installed on the side wall 114 (see FIG. 16) of the drain pan (not shown), the inner or center sensor conductor 126 and the outer sensor conductor 130 connect the inner or center liquid sensing probe or element 118 and the outer substantially circular liquid sensing element 120 to the connector 122 which, in turn, is coupled or connected to the sensing electronic or signal producing means 2. The inner or center liquid sensing probe or element 118 carries an electrical potential when the liquid level within the drain pan (not shown) contacts the inner or center liquid sensing probe or element 118. As the liquid level continues to rise, the liquid will contact the outer substantially circular liquid sensing element 120 completing an electric circuit with the sensing electronic or signal producing means 2 to actuate an alarm such as a light or sound, to shut off the air handler or to actuate a pump to remove the liquid condensate 116 from the drain pan (not shown).

Once the liquid level recedes below the outer substantially circular liquid sensing element 120, the liquid level sensing system or device 110 will reset to provide for a subsequent accumulation of liquid condensate 116.

As shown in FIG. 16, an O-ring 158 is preferably placed between the enlarged outer portion 138 of the externally threaded hollow plug 142 and the outer surface of the side wall 114 to seal the drain port 112.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid level sensing system to monitor the liquid level in a drain pan associated with a liquid producing unit, said liquid sensing system comprising:
    a first liquid sensor including a distal end portion disposed within the drain pan and electrically connected to a first power potential;
    a second liquid sensor including a distal end portion disposed within the drain pan electrically connected to a second power potential;
    said distal end portion of said first liquid sensor being disposed higher in the drain pan than at least a portion of said distal end portion of said second liquid sensor;
    a signal generating module operatively coupled to said first liquid sensor and to said second liquid sensor such that when liquid within the drain pan reaches a predetermined level said first liquid sensor and said second liquid sensor contact the liquid causing said signal generating module to generate a shutoff signal fed to the liquid producing unit causing the liquid producing unit to cease producing liquid; and
    wherein said liquid sensing further includes an anti-microbial member comprising an anti-microbial material to inhibit the growth of moss, algae or fungus on and near said first liquid sensor or said second liquid sensor.

2. The liquid level sensing system of claim 1 wherein said first liquid sensor and said second liquid sensor are coupled to the drain pan by a plug mounted to the side wall of the drain pan and said anti-microbial member is coupled to said plug by a coupler comprising a body including a groove or recess formed thereon to receive and retain said anti-microbial member.

3. The liquid level sensing system of claim 2 wherein said anti-microbial member comprises a ring or circular element of copper, zinc, silver or other anti-microbial material.

4. The liquid level sensing system of claim 2 wherein said first liquid sensor comprises a inner liquid sensing element and said second liquid sensor comprises an outer substantially circular liquid sensing element.

5. The liquid level sensing system of claim 4 further including a hollow liquid wicking member extending outwardly from said body into the drain pan having said inner liquid sensing probe extending therethrough to draw liquid away from said inner liquid sensing element to said outer substantially circular liquid sensing element.

6. The liquid level sensing system of claim 4 wherein said plug comprises a passage formed in an enlarged outer portion thereof and a chamber formed in a reduced inner portion thereof configured to mount said liquid level sensing system to the side wall of the drain pan to secure said inner liquid sensing element and said outer substantially circular liquid sensing element in liquid sensing relationship relative to the interior of the drain pan.

7. The liquid level sensing system of claim 6 wherein a plurality of flexible mounting legs extend outwardly from said body of said coupler to press-fit or snap into said chamber of said plug to secure said coupler to said plug.

8. The liquid level sensing system of claim 7 wherein, said coupler engages and retains said inner liquid sensing element, said outer substantially circular element and said anti-microbial member in place.

9. The liquid level sensing system of claim 8 further includes a center seal member comprising a thermo-plastic or similar flowable material injected into said chamber of said plug to form a seal between the interior of the drain pan and the exterior thereof.

10. The liquid level sensing system of claim 1 wherein said signal generating module generates a signal when the liquid level reaches said predetermined level to actuate an alarm such as a light or sound.

11. The liquid level sensing system of claim 1 wherein said signal generating mode generates a signal when the liquid level reaches said predetermined level to actuate a pump to remove the liquid condensate from the drain pan.

12. The liquid level sensing system of claim 4 wherein once the liquid level recedes below said predetermined level, said liquid level sensing system resets to allow for a subsequent of said signal generating module.

13. The liquid level sensing system of claim 6 further comprising a seal in association with said enlarged outer portion of said plug.

14. The liquid level sensing system of claim 13 wherein said seal is an O-ring.

15. The liquid level sensing system of claim 1 further comprising a connector separating said first liquid sensor and said second liquid sensor from said signal generating module.

16. The liquid level sensing system of claim 15 wherein said connector provides a water-resistant connection between said signal generating module and said first and second liquid sensors.

17. The liquid level sensing system of claim 15 wherein said connector provides a quick-disconnect connection between said signal generating module and said first and second liquid sensors.

18. The liquid level sensing system of claim 15 wherein said connector provides a water-resistant, quick-disconnect connection between said signal generating module and said first and second liquid sensors.

\* \* \* \* \*